United States Patent
Drummond et al.

(10) Patent No.: US 6,904,348 B2
(45) Date of Patent: *Jun. 7, 2005

(54) VEHICULAR CONTROL SYSTEM

(75) Inventors: John P. Drummond, Glenageary (IE); Hassel J. Savard, Grand Rapids, MI (US); Kenneth Schofield, Holland, MI (US); Sean J. Fletcher, Ballinteer (IE); Kenneth L. Schierbeek, Zeeland, MI (US)

(73) Assignee: Donnelly Corporation, Holland, MI (US)

( * ) Notice: Subject to any disclaimer, the term of this patent is extended or adjusted under 35 U.S.C. 154(b) by 110 days.

This patent is subject to a terminal disclaimer.

(21) Appl. No.: 10/356,939

(22) Filed: Feb. 3, 2003

(65) Prior Publication Data

US 2003/0144783 A1 Jul. 31, 2003

Related U.S. Application Data

(63) Continuation of application No. 09/941,061, filed on Aug. 28, 2001, now Pat. No. 6,515,378, which is a continuation of application No. 09/341,450, filed as application No. PCT/IE98/00001 on Jan. 9, 1998, now Pat. No. 6,291,905.

(30) Foreign Application Priority Data

| Jan. 9, 1997 | (IE) | ............................................. 970014 |
| Mar. 21, 1997 | (IE) | ............................................. 970223 |

(51) Int. Cl.[7] ............................................. G02B 5/08
(52) U.S. Cl. ........................ 701/49; 307/16.1; 359/602; 359/604
(58) Field of Search .......................... 701/49; 307/10.1, 307/9.1; 359/843, 841, 877

(56) References Cited

U.S. PATENT DOCUMENTS

| 5,455,716 A | 10/1995 | Suman et al. ................ 359/838 |
| 5,659,423 A | 8/1997 | Schierbeek et al. ......... 359/604 |
| 5,796,176 A | 8/1998 | Kramer et al. .............. 307/10.1 |
| 5,798,575 A | 8/1998 | O'Farrell et al. ........... 307/10.1 |
| 5,877,897 A | 3/1999 | Schofield et al. ........... 359/604 |
| 5,959,367 A | 9/1999 | O'Farrell et al. ........... 307/10.1 |
| 6,056,410 A | 5/2000 | Hoekstra et al. ............ 359/603 |

(Continued)

OTHER PUBLICATIONS

Commonly assigned, co-pending U.S. Appl. No. 09/952,693, filed Sep. 12, 2001 by Applicant Kenneth L. Schierbeek, entitled Digital Electrochromic Mirror System.

*Primary Examiner*—Albert W. Paladini
(74) *Attorney, Agent, or Firm*—Van Dyke, Gardner, Linn & Burkhart, LLP

(57) ABSTRACT

A vehicular control system comprises a rearview mirror assembly and a microcontroller. The rearview mirror assembly comprises a housing and a variable reflectivity electro-optic mirror element. The microcontroller is operable to control the reflectivity of the variable reflectivity electro-optic mirror element. The microcontroller may be operable to control a plurality of accessories of the vehicle via a node of a vehicle control network. The microcontroller may be operable to receive signals from and/or transmit signals to at least one of the accessories via the node of the vehicle control network. The microcontroller may be in communication with a second microcontroller located in the mirror housing or exterior to the mirror housing. The microcontroller and the second microcontroller may be cooperatively operable. The microcontroller and the second microcontroller may be in master/slave relationship.

37 Claims, 6 Drawing Sheets

U.S. PATENT DOCUMENTS

| | | |
|---|---|---|
| 6,089,721 A | 7/2000 | Schierbeek ................. 359/603 |
| 6,210,008 B1 | 4/2001 | Hoekstra et al. ............ 359/603 |
| 6,291,905 B1 | 9/2001 | Drummond et al. ....... 307/10.1 |
| 6,299,315 B2 | 10/2001 | Hoekstra et al. ............ 359/603 |
| 6,300,879 B1 * | 10/2001 | Regan et al. ............... 340/654 |
| 6,305,807 B1 | 10/2001 | Schierbeek ................. 359/603 |
| 6,314,352 B1 * | 11/2001 | Kunimatsu et al. ........... 701/49 |
| 6,406,152 B1 | 6/2002 | Hoekstra et al. ............ 359/603 |
| 6,406,154 B1 * | 6/2002 | Chen .......................... 359/877 |
| 6,474,820 B1 | 11/2002 | Hoekstra et al. ............ 359/603 |
| 6,515,378 B2 * | 2/2003 | Drummond et al. ....... 307/10.1 |

* cited by examiner

VEHICULAR CONTROL SYSTEM

The present application is a continuation of U.S. patent application, Ser. No. 09/941,061, filed Aug. 28, 2001 for VEHICLE REARVIEW MIRROR SYSTEM, now U.S. Pat. No. 6,515,378, which is a continuation of U.S. patent application, Ser. No. 09/341,450, filed Jul. 8, 1999 for VEHICLE REARVIEW MIRROR AND A VEHICLE CONTROL SYSTEM INCORPORATING SUCH MIRROR now U.S. Pat. No. 6,291,905, which is the National Phase of and claims priority on International Application No. PCT/IE98/00001, filed Jan. 9, 1998, entitled VEHICLE REARVIEW MIRROR AND A VEHICLE CONTROL SYSTEM INCORPORATING SUCH MIRROR, which are all hereby incorporated herein by refrrence.

The present invention relates to a vehicle rearview mirror and a vehicle control system incorporating such mirror.

According to the present invention there is provided a vehicle rearview mirror comprising a mirror housing containing a variable reflectivity mirror unit and a microcontroller for controlling the reflectivity of the mirror unit.

There is also provided, as a further independent invention, a vehicle control system comprising a rearview mirror housing, a variable reflectivity mirror unit mounted in the mirror housing, a master microcontroller mounted in the mirror housing for controlling the reflectivity of the mirror unit, a roof housing positioned on the interior roof of the vehicle, a slave microcontroller mounted in the roof housing and connected to the master microcontroller, and at least one input and/or output device connected to the slave microcontroller.

There is also provided, as a further independent invention, a vehicle control system comprising a network controlling a plurality of functions of the vehicle, the network having a node located in a rearview mirror housing of the vehicle, such node controlling at least one function of the mirror.

There is also provided, as a further independent invention, apparatus for controlling an optical characteristic of a vehicle component in accordance with the duty cycle of a pulse width modulated signal.

An embodiment of the invention will now be described, by way of example, with reference to the accompanying drawings, in which FIG. 1 is a schematic view of a vehicle including a control system according to the invention;

Figure 1:
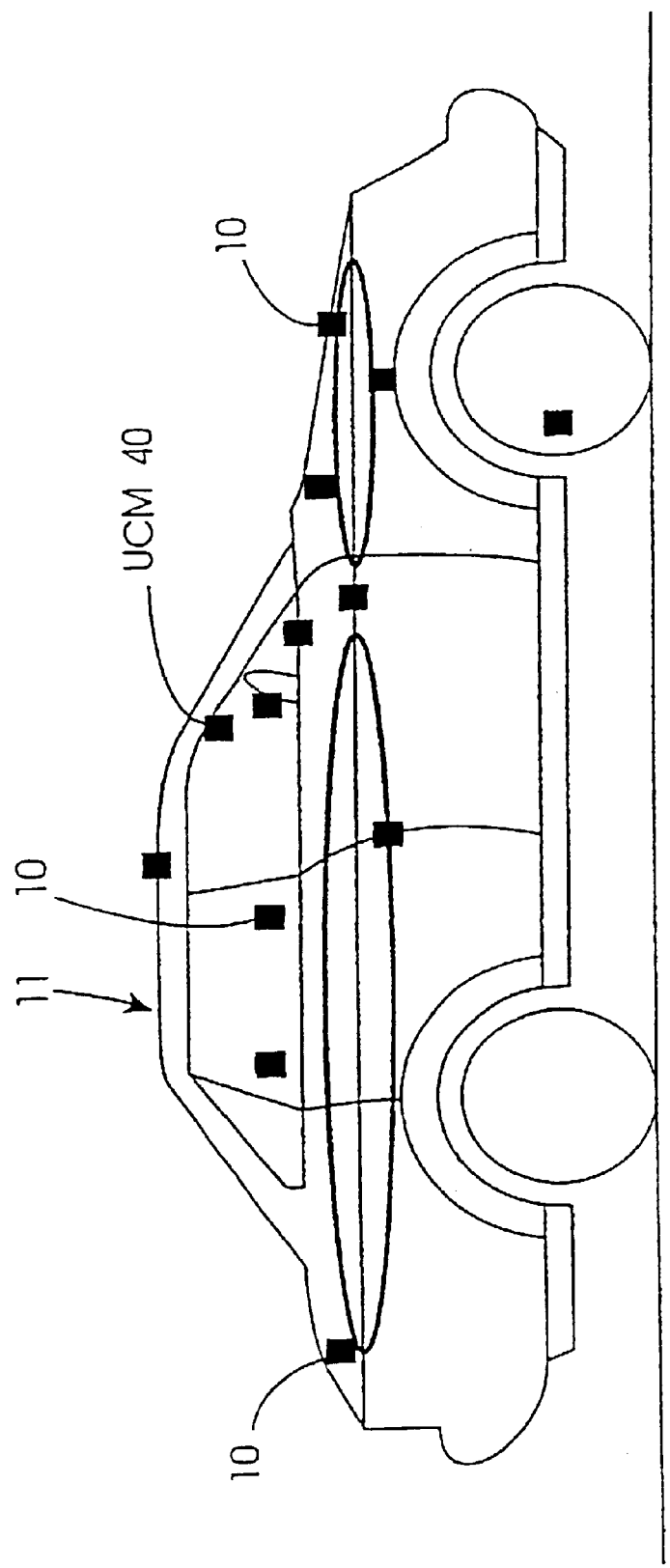

Referring now to the drawings wherein similar numerals have been used to indicate like parts, a vehicle control system comprises a network of nodes 10 distributed about the vehicle 11. Each node 10 controls the operation of particular part of the vehicle, e.g. the engine, brakes, door locks, etc. In the embodiment of the invention, one of the nodes, identified as UCM 40 in FIG. 1, is located in the housing of the vehicle interior rear view mirror as will be described.

Each node 10 in the network communicates with each other node using an industry standard CAN (Controller Area Network) network protocol. A CAN network is a multi-master CSMA/CA (carrier sense multiple access collision avoidance) arbitrated bus, such as has been developed by Bosch specifically for use in the automotive industry where it is critical that messages be executed within a predetermined time span; see, for example, PCT Application Nos. WO 90/01739 and WO 94/06081. Each node includes a controller having a back end and a front end. The back end of the controller is connected to sensors and actuators while the front end communicates with each of the other node front ends across a two-wire bus, CAN_H, CAN_L.

The front end of each node controller in a CAN network has a memory containing a table of node-specific message identifiers. Only messages with these identifiers can be transmitted or received by the node. There is a maximum of 2048 indentifiers. For transmission, the back end of the controller writes a message to a message buffer in the front end controller and sets a flag. The transmission is then automatically executed by the front end of the controller. The front end decides whether to process a message placed on the network by any other node using an acceptance filter. The criterion for this decision is the identifier included in every message. Only messages, which pass the acceptance filter are stored in the receive buffer and transferred to the back end controllers memory.

There are a number of available microcontrollers incorporating CAN controllers, for example, a Motorola MC68HC08AZ0. Other examples of CAN controllers are Philips PCA 82C200 or Intel 82526. These controllers enable nodes to communicate with one another to transmit the status of sensors or actuators across the network. It will be seen that because only a two-wire bus is required to connect each of the nodes on the network together, significant weight savings can be made in the vehicle's electrical harness for the same level of functionality.

Figure 2:
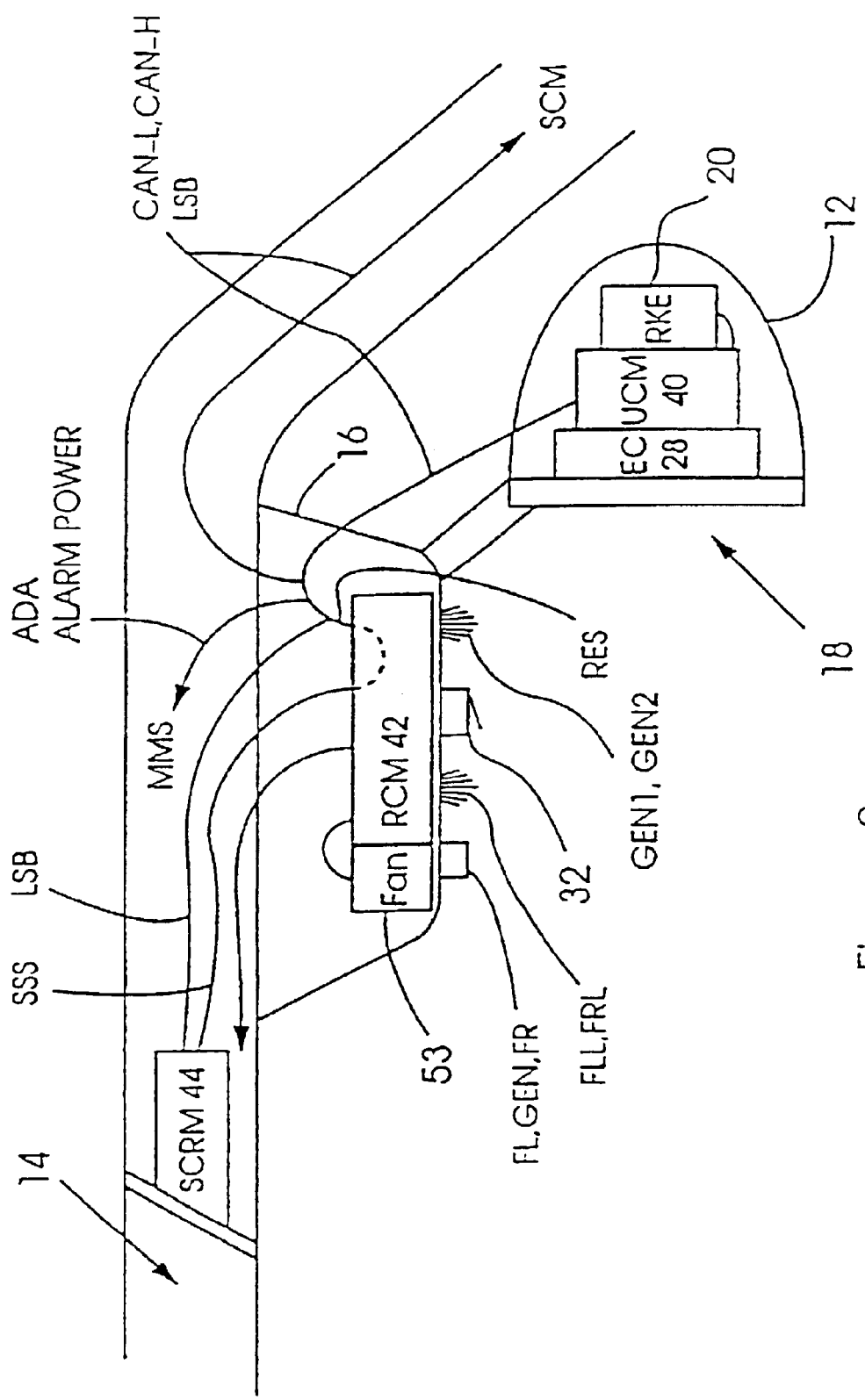
FIG. 2 is a schematic view of the upper windscreen and front roof area of the vehicle and control system of FIG. 1.

In the present embodiment, a CAN node 40 for controlling electronic equipment in the upper area of the vehicle, referred to as a UCM (upper control module), is located inside the housing 12 of an interior rearview mirror 18, FIG. 2. It is advantageous to place the UCM 40 in the mirror housing as it is less susceptible to noise and excess temperatures than if it were located in or adjacent the roof cavity of the vehicle. It is therefore possible to use a controller and associated electronics with a lower temperature rating than if the UCM 40 were placed in the roof cavity. If a higher rated controller is used, however, it can perform more reliably than if it were located in the roof cavity.

The mirror 18 contains an electro-optic mirror unit, that is, a mirror unit of a type whose reflectivity can be varied as a function of an applied voltage. In the present embodiment the mirror unit comprises an electro-optic cell (EC) 28. As is well known, an electro-optic cell comprises an electro-optic medium such as an electrochromic or liquid crystal material sandwiched between a pair of, usually, glass plates. When a voltage is applied across the layer it colours, or darkens, to decrease the transmissivity of the cell, the amount of darkening increasing with increasing voltage. Within the mirror housing 12 the cell 28 is located in front of a reflecting surface (or alternatively the reflecting surface may be formed directly on one of the glass plates) so that, as seen by the driver, the reflectivity of the mirror decreases with increasing voltage. The construction and operation of such mirrors is very well known in the art; see, for example, U.S. Pat. Nos. 5,140,455, 5,572,345 and 5,151,816, and European Application No. 92308022.0, or as described for example in the following papers: N. R. Lynam, "Electrochromic Automotive Day/Mirrors", SAE Technical Paper Series, 870636 (1978); N. R. Lynam, "Smart Windows for Automobiles", SAE Technical Paper Series, 900419 (1990); N. R. Lynam and A. Agrawal, "Automotive Applications of Chromogenic Materials", Large Area Chromogenics: Materials & Devices for Transmittance Control, C. M. Lampert and C. G. Granquist, eds., Optical Eng'g Press, Washington (1990).

In the present embodiment, electronic equipment in the upper area of the vehicle is controlled by or communicates with the UCM 40 and includes the electro-optic cell (EC) 28 of the mirror 18, a remote keyless entry (RKE) unit 20, a vehicle sun-roof 14, an alarm siren (not shown), and various lamps, switches and other equipment contained in a roof housing 16 positioned on the interior roof of the vehicle. The UCM 40 controls, inter alia, the cell 28 and the RKE unit 20 directly, but controls the other equipment indirectly via respective slave controllers which communicate with the UCM 40 via a local sector network which, in the present embodiment, is a half-duplex master-slave network. These other controllers are a roof control module (RCM) 42 located in the roof housing 16, a siren control module (SCM, not shown) and a sun-roof control module (SRCM) 44. In the present embodiment, master-slave communication is implemented across a conventional single-wire interface complying with ISO9141 referred to hereafter as LSB.

Figure 3:
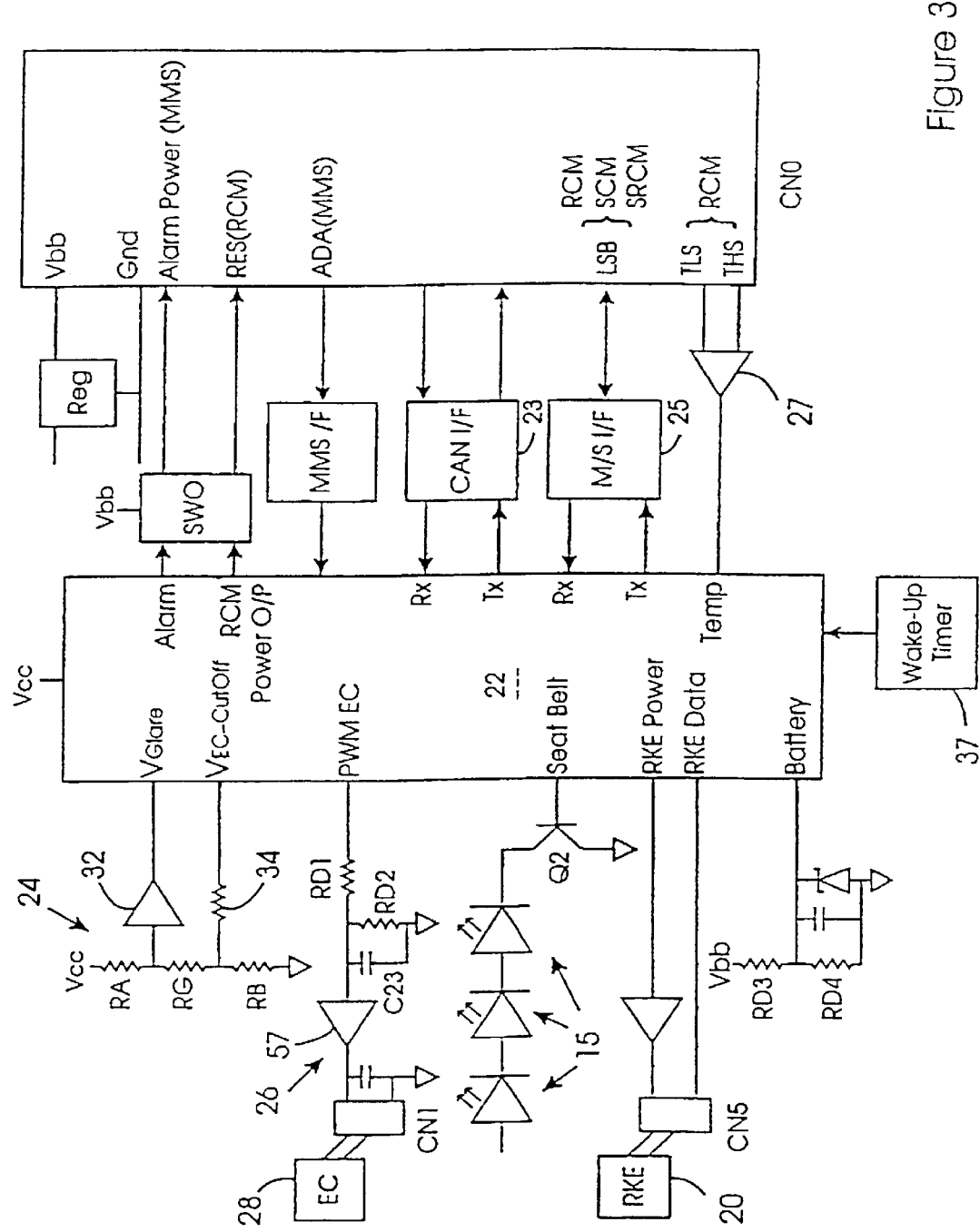
FIG. 3 is a block circuit diagram of the UCM 40 in the rearview mirror housing of FIG. 2 for use with a first embodiment of the RCM 42 in the roof housing of FIG. 2.

Turning now to FIG. 3, the UCM 40 of the present embodiment includes a Motorola MC68H08 microcontroller 22 mounted on a printed circuit board (PCB) within the mirror housing 12. The controller is connected to the CAN bus via a CAN interface circuit 23 which includes a Philips PCA82C250 CAN transceiver. The transceiver complies with ISO/DIS 11898 and converts the two-wire CAN bus signal into separate Rx and Tx signal lines which connect to respective input and output pins on the controller 22.

The controller 22 is connected to an input circuit 24 and an output circuit 26 for controlling the transmissivity of the electro-optic cell 28 and hence the reflectivity of the mirror 18.

The input circuit 24 comprises a series of three resistors RA, RG and RB which are used to determine the ambient light levels around the vehicle. Both RA and RG are light dependent resistors whose resistance is inversely proportional to the level of light falling on them. RA and RB are incorporated in respective ambient light sensors facing forwardly and rearwardly of the vehicle respectively. Since the construction and operation of such sensors is well known only the electrically operative part, the resistors themselves, are shown in the drawings. The node between RG and RA is connected via buffer circuitry 32 to an analog input pin Vglare of the controller. In conditions where the vehicle is lit primarily from the rear by the headlights of another vehicle, the level of light falling on RG exceeds that falling on RA and the voltage drop across RG decreases. Vglare thus decreases which, as will be seen in FIG. 5 to be described, causes the controller 22 to decrease the transmissivity of EC 28 and hence decrease the reflectivity of the mirror 18.

It is desirable to assess the overall ambient light level in determining the mirror reflectivity so that the degree of control can be reduced in daylight or relatively bright ambient conditions. RB is a constant value resistor and the node between RB and RG is connected via a biasing resistor 34 to an analog input pin Vec_cutoff of the controller 22. Thus, in brightening conditions, as the aggregate light level falling on resistors RA and RG increases and their resistance decreases, the voltage drop across RB also increases by a corresponding level. It will be seen that the increasing voltage drop across RB causes Vac_cutoff to rise gradually, and thus as the overall ambient light level increases the degree of control gradually decreases as also will be seen in FIG. 5.

The output circuit 26 drives the electro-optic cell 28 via a digital pulse width modulated (PWM) output pin PWM EC to control the mirror reflectivity. In the present case the output pin PWM EC provides a voltage level of 5 volts when it is on, and zero volts when it is off. PWM control obviates the need for either an internal or an externally addressed DAC. It will be seen that by separating the input circuit 24 and the output circuit 26 with the UCM microcontroller, the UCM is able to assert intelligent software control over the mirror reflectivity.

The cell 28 is connected to the controller 22 via a two pin connector CN1 on the UCM PCB or alternatively the connection may be made with soldered wires. A voltage difference of 1.4 V supplied to the cell 28 across the two pins of the connector is sufficient to drive the cell to minimum transmissivity and hence reduce the mirror reflectivity to a minimum, while the absence of a voltage difference between the two pins clears the cell. Therefore, a pair of resistors RD1 (100K) and RD2 (39K) are used to divide the 5 volts on the output pin PWM EC of the controller in the ratio 28:72, providing 1.4 V at the junction of the resistors RD1 and RD2 for a constant 5 volts at PWM EC.

The 5 volt output signal at PWM EC is modulated by the controller 22 under software control (FIG. 5) to have an on/off duty cycle between 0 and 100%. A capacitor C23, connected in parallel with resistor RD2, is used to smooth PWM EC signals with a duty cycle less than 100% to a substantially constant voltage between 0 and 1.4 V in proportion to the duty cycle. The value of the capacitor C23 is chosen as 1 uF so that the corner frequency of the filter comprising RD1, RD2 and C23 is significantly below the frequency of the PWM signal to provide a smooth DC signal. A buffer circuit 57 is connected between the voltage divided output signal and the connector pin to provide a high impedance quick clearing output to the cell 28.

Microprocessor control of the cell 28 enables parameters controlling the level of mirror reflectivity to be programmed. These parameters are:

1. A threshold ambient light level at which the mirror should be cleared, (Vec_off);
2. Gain (G); and
3. Start of colour (Cs)

These three programmable parameters are stored in reprogrammable, non-volatile memory and are updated from a computer which plugs into the CAN bus.

Figure 5:
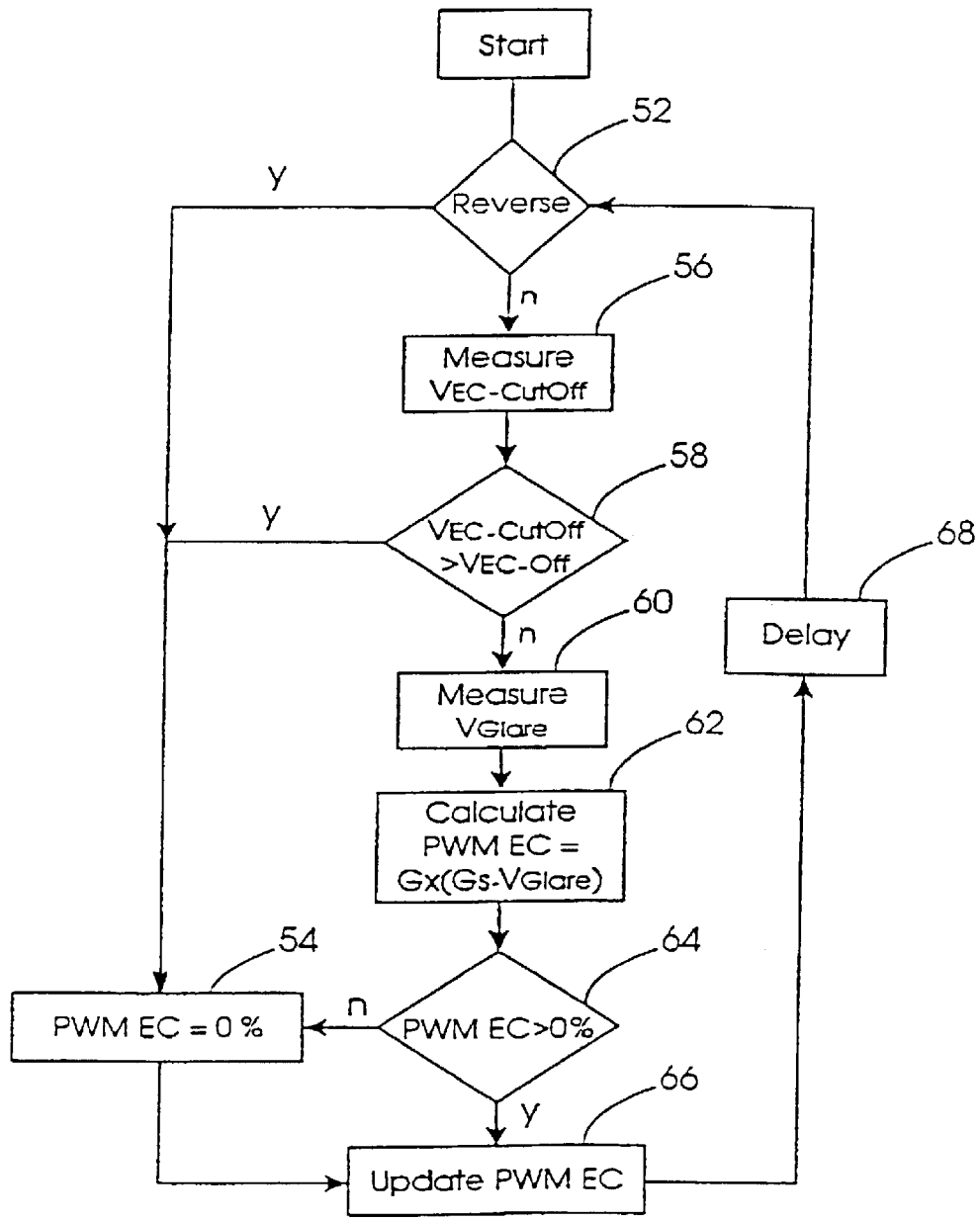
FIG. 5 is a flow diagram illustrating the method by which the node of FIG. 3 controls the reflectivity of an electro-optic mirror.

Once initiated, a software routine, FIG. 5, runs continually on the controller 22 and monitors Vec_cutoff and Vglare to determine the duty cycle of the 5 volt signal at the PWM EC output pin. The routine first checks at step 52 whether the vehicle is in reverse. If so, the mirror is cleared at step 54 by setting the desired value of the duty cycle of the PWM EC signal to 0% and updating the duty cycle accordingly at step 66. If not, Vec_cutoff is measured at step 56. The routine then checks at step 58 if Vec_cutoff is greater than the pre-programmed threshold level Vec_off. If so, the mirror is cleared as before at steps 54 and 66.

The routine continues by measuring Vglare at step 60 and the duty cycle of PWM EC is calculated at step 62 using the formula:

$$\text{Gain} \times (\text{Start of colour} - \text{Vglare})$$

If this formula produces a negative value, as determined at step 64, which is possible if Cs is set low, then the cell is cleared at step 54. Otherwise the duty cycle of PWM EC is updated at step 66 to the value calculated at step 62, whereupon the routine waits for a pre-determined delay 68 before returning to step 52.

Returning to FIG. 3, the controller 22 communicates with each of the RCM, SCM and SRCM slave controllers via the single-wire bus LSB. The half-duplex signalling on LSB is converted by a conventional ISO 9141 compatible interface circuit 25 into separate Rx and Tx signal lines which connect to respective input and output pins on the controller.

The controller 22 communicates with respective controllers in the slave devices in a frame format comprising a plurality of words, each word comprising 1 start bit, 9 data bits and 1 stop bit. The controller 22 intermittently transmits a polling frame including a header word, a body comprising up to 8 words and a 1 word checksum onto the bus, LSB. The header word includes a four bit frame ID, a four bit negated frame ID, for error checking, with the 9th bit always set to 1. The nine bit format allows for a parity bit to be used for each word in the body although this is not necessary. The checksum is a modulo 256-sum of the data bytes.

If a slave controller sees a frame for which it is to respond, it replies by transmitting a frame including the relevant data back to the controller 22.

Figure 4:
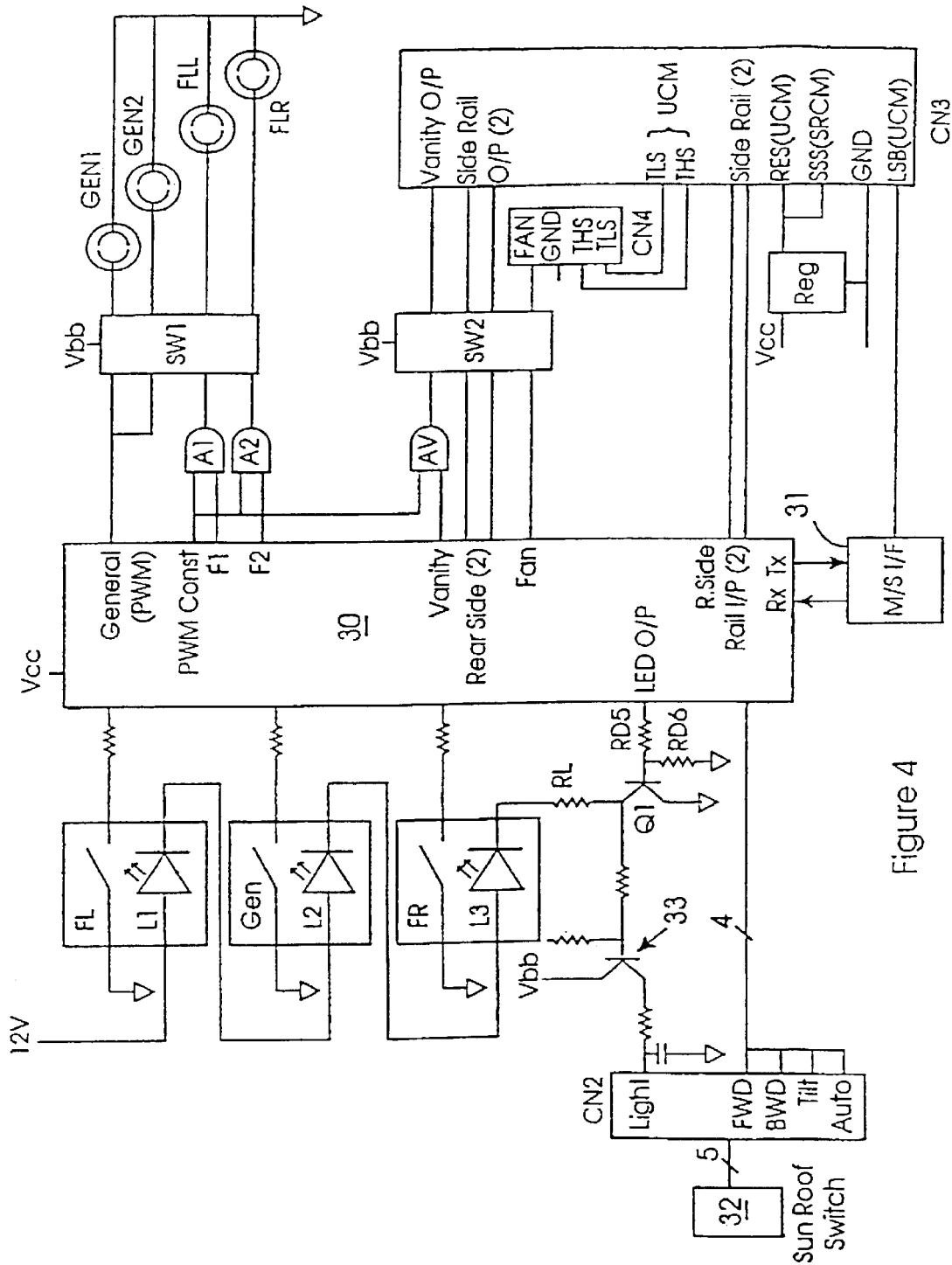
FIG. 4 is a block circuit diagram of the first embodiment of the RCM 42 in the roof housing of FIG. 2.

FIG. 4 is a schematic illustration of a first embodiment of the RCM 42 contained in the roof housing 16. In the first embodiment, the RCM 42 includes a Motorola MC68HC05D9 microcontroller 30 mounted on a PCB in the roof housing 16. The RCM controller 30 communicates with the UCM controller 22 via the bus LSB, through connectors CN0 and CN3 on the UCM and RCM PCBs respectively. The half-duplex signalling on LSB is converted by an interface circuit 31 circuit corresponding to the interface circuit 25 of the UCM 40 which converts the LSB signal into separate Rx and Tx signal lines which connect to respective input and output pins on the controller 30.

The RCM controller 30 is connected to three switches FL, Gen and FR mounted on the RCM PCB in the roof housing 16. Each switch includes switch contacts located behind respective buttons exposed at the surface of the roof housing 16 which are actuable from within the vehicle cabin to open and close the switch contacts. Each switch has an associated LED L1, L2, L3 which are wired in series and connected between a protected battery voltage 12 V nominal and via a current limiting resistor RL to the collector of a transistor Q1. The base of Q1 is connected to a digital output pin LED O/P via a resistor-divider network RD5, RD6. In low ambient light conditions, as determined by the controller 30 over the CAN network, LED O/P is switched high to turn on the transistor Q1 and light the LED's which in turn illuminate the buttons of their respective switches FL, Gen, FR.

The RCM controller 30 is further connected to a sun-roof switch 32 also mounted within the roof housing 16, FIG. 2, the switch 32 also having an LED for inbuilt illumination of the switch. A suitable switch is manufactured by Alps Electric Co. Ltd. Japan. The switch 32 is connected to the controller 30 via a multi-wire flexible cable to a connector CN2 on the RCM PCB. The collector of the transistor Q1 is connected via a driver circuit 33 to a pin, Light, on the connector CN2 so that when LED O/P is switched high, the sun-roof switch is also illuminated.

The sun-roof switch includes outputs indicating the direction a user wishes to move the sun-roof 14—forward (FWD), backward (BWD), tilt (Tilt) and automatic open (Auto). Each output is connected to a respective input pin on the controller 30 via the connector CN2. When any output changes state, the controller 30 waits to be polled by the UCM controller 22 before transmitting the information relating to the change of state of the switch 32.

The UCM controller 22 then polls the controller (not shown) in the SRCM 44 via LSB to communicate the position of the sun-roof switch to the SRCM. The sun-roof controller then moves the sun-roof, or not, in the appropriate direction. It will be seen that because the sun-roof switch 32 is not connected directly to the sun-roof 14, but via the UCM 40, the conditions under which the roof opens/closes or tilts can be user specified.

The technique whereby the RCM controller 30 communicates a change in state of an input to the UCM controller 22 which in turn instructs a slave node, for example the RCM 42 itself, to actuate an output, is also applied to the switching of lamps located around the vehicle.

A number of such lamps are mounted on the RCM PCB in the roof housing 16, that is, two general lamps GEN1, GEN2 and left and right front reading lamps FLL and FRL, FIGS. 2 and 4. Each lamp is switched by an output pin of the controller 30 via one channel of a quad high side driver SW1 to the battery voltage Vbb. The RCM controller 30 is further connected to vanity lamps (not shown) located above two front sun-visors and two rear side rail reading lamps (not shown) through a second quad high side driver SW2. These lamps and the respective switches (not shown) for the side rail reading lamps are connected to the RCM PCB via the connector CN3.

The RCM 42 uses PWM control to ramp the voltage supply when turning on the general lamps GEN1 and GEN2, and to control the final voltage supplied to the general lamps as well as the voltage supplied to the vanity lamp and to the front reading lamps FLL, FRL to prevent overdriving the lamps due to variations in the battery level Vbb.

The general lamps GEN1, GEN2 are both ramped on when a vehicle door is opened, or when the Gen switch is closed, in the following manner. In the former case the opening of a door is signalled across the CAN bus to the UCM controller 22 in known manner, while in the latter case the controller 30 reports the closure of the Gen switch to the UCM controller 22. In either case the controller 22 then instructs the RCM controller 30 across the bus LSB to turn on the general lamps GEN1, GEN2 by specifying a maximum PWM duty cycle of a 5 v PWM output pin, General. This specified maximum PWM duty cycle is inversely proportional to the battery voltage Vbb, which is determined by the UCM controller 22 via a resistor-divider network RD3, RD4, FIG. 3.

The General output pin is connected to two inputs on the quad high side driver SW1. When enabled by a 5 v signal from the General output pin, these inputs connect the battery voltage Vbb to the respective general lamps GEN1, GEN2; thus the battery voltage supplied to the lamps GEN1, GEN2 is pulse width modulated with the same instantaneous duty cycle as the voltage at the General output pin.

The RCM controller 30 steps the General output from 0% to the maximum PWM duty cycle specified by the UCM controller 22 over a pre-determined number of steps as a function of time. By matching the step increments to the increasing resistance value of the lamp filaments as they heat up, the power dissipated by the lamps is ramped approximately linearly and so the problem of lamp failure due to thermal shock is mitigated as well as providing an enhanced visual effect.

Similarly, the RCM controller 30 is instructed to turn on the front reading lamps FLL, FRL and the vanity lamp located in the sun visor by the UCM controller 22. In the case of the front reading lamps, the RCM controller 30 detects the closing of switch FL or FR and reports this to the UCM controller 22. The UCM controller 22 then instructs the RCM controller 30 to turn on the respective lamp FLL or FRL by enabling output F1 or F2 and specifying a constant PWM duty cycle of the voltage at an output, PWM Const, of the controller 30. As before, the specified PWM duty cycle is inversely proportional to battery level.

In the case of the vanity lamp, the RCM controller 30 is instructed to switch the vanity lamp on by the UCM controller 22 when the latter sees across the CAN bus that the sun-visor has been pulled down. This is done by enabling the Vanity output of the controller 30 and again specifying a constant PWM duty cycle of the voltage at the output PWM Const inversely proportional to battery level.

Each of the outputs F1, F2 and Vanity is "anded" with the output PWM Const so that only that lamp whose output from the controller 30 is enabled will illuminate. It will be observed that in contrast to the general lamps, the reading and vanity lamps are not ramped up but are switched on immediately to the specified constant PWM duty cycle. This reduces the amount of software control that would have been required to produce three independent PWM signals.

It will be recognised that the conditions under which the any of the lamps connected to the RCM 42 are switched on and off can be customised by programming the UCM controller 22. For example, the controller 22 could be programmed to ignore the opening of a door or the switching on of one of the switches FL, Gen or FR if it determined that the ambient light level were sufficiently high not to warrant turning on the corresponding lamp. The voltage at the junctions of the resistors RA, RG, RB which control the electro-optic cell 28 could be used for determining ambient light level for this purpose, or as in the present embodiment the ambient light level can be determined by the UCM controller 22 across the CAN bus from a separate light sensor.

The RCM 42 is also connected to a climate control unit 53 comprising a fan and a thermistor (not shown). Power is supplied to the fan from the RCM 42. A Fan output of the controller 30 is connected to an input of the driver SW2. The corresponding output of the driver SW2 is connected to a pin FAN on a connector CN4. The thermistor has two terminals connected directly to respective pins THS, TLS on the connector CN4. These pins are connected to respective pins on the connector CN3 which are in turn connected via the vehicle harness to respective pins on the UCM connector CN0. The differential signal is passed through conditioning circuitry 27 and connected to an analog input Temp of the UCM controller 22. The temperature of the vehicle cabin can thus be relayed by the UCM controller to any other nodes across the network.

For example, if the temperature of the cabin rose to dangerous levels while the vehicle were stationary and, if the presence of a person in the vehicle were detected by a seat occupancy detector (see below), the sun-roof could be instructed to open slightly by the SRCM. Similarly, if a rain sensor (see below) indicates rain, the SRCM may not open the sun-roof.

The UCM controller 22 also controls the remote keyless entry RKE unit 20 which is also mounted within the mirror housing 12. The UCM 40 is connected to the RKE unit 20 via a multi pin connector CN5. Among other signals, 5 V power is supplied to the RKE unit 20 from the RKE Power output pin on the controller 22 via one connector pin and data is returned by the RKE unit 20 to the RKE Data input pin on the controller 22 via the second connector pin.

It will be seen that it is not desirable for all of the vehicle electronics to be drawing battery power while the vehicle is stationary without its engine running for more than a predetermined time. The CAN nodes of the network therefore enters a low power sleep mode.

In the present embodiment, a wake up timer has a frequency approximately 3 Hz and is connected to an input pin of the UCM controller 22. When interrupted, the controller 22 interrogates the RKE unit 20 to determine if the vehicle is to be entered legitimately. During at least one of these interrupts, the controller 22 also sends a message to the SCM via LSB to tell the siren that the network is functioning normally and that an alarm is not to sound.

Battery power to the slave nodes RCM 42 and SRCM 44 as well as a mass motion sensor unit (MMS) is switched by the UCM 40. An RCM power output pin (RCM Power O/P) is connected to an input channel of a quad high side driver SW0 on the UCM PCB. A signal on this pin connects the battery voltage Vbb to a line RES which connects to the connector CN3 on the RCM PCB via the connector CN0 on the UCM PCB. The RES signal is in turn channelled by the connector CN3 to the SRCM 44 on line SSS. Thus, when in sleep mode the UCM 40 can remove power from the RCM and SRCM slave nodes in the master-slave network.

An Alarm output of the UCM controller is independently connected to an input of the driver SW0. A corresponding output pin of the driver is connected to a pin (Alarm Power) on the connector CN0 which is connected via the vehicle harness to the MMS. Thus, the UCM 40 can remove power from the MMS when the vehicle has been legitimately entered, so that the ADA signal is not asserted.

The MMS supplies a sensor output signal ADA to the UCM controller 22 via a mass motion sensor interface (MMS I/F). The UCM controller 22 is therefore able to determine whether an alarm should sound. It should be understood that the ADA signal will be active as soon as someone enters the vehicle illegally.

The mirror housing 12 also includes seat belt warning lamps 15, FIG. 3. These lamps are connected in series to the collector of a transistor Q2 whose base is connected to an output pin of the controller 22. In the present embodiment, when the vehicle ignition is turned on, the UCM controller 22 flashes the seat belt warning lamps 15 for a predetermined time or until the UCM is instructed over the CAN bus to stop. The lamps are displayed prominently on the mirror housing 12 where they are sure to be noticed by any occupants of the vehicle.

In a typical CAN network, vehicle parameter values are usually calculated at one node. If another node wishes to determine the value of the parameter, it monitors the value across the network. It will be seen, however, that due to the limitation in the number of message identifiers and bandwidth of the network, there is a cost in software in communicating sensor/actuator values across the network. For this reason, it is advantageous to hardwire certain signals within the vehicle control system.

Figure 6:
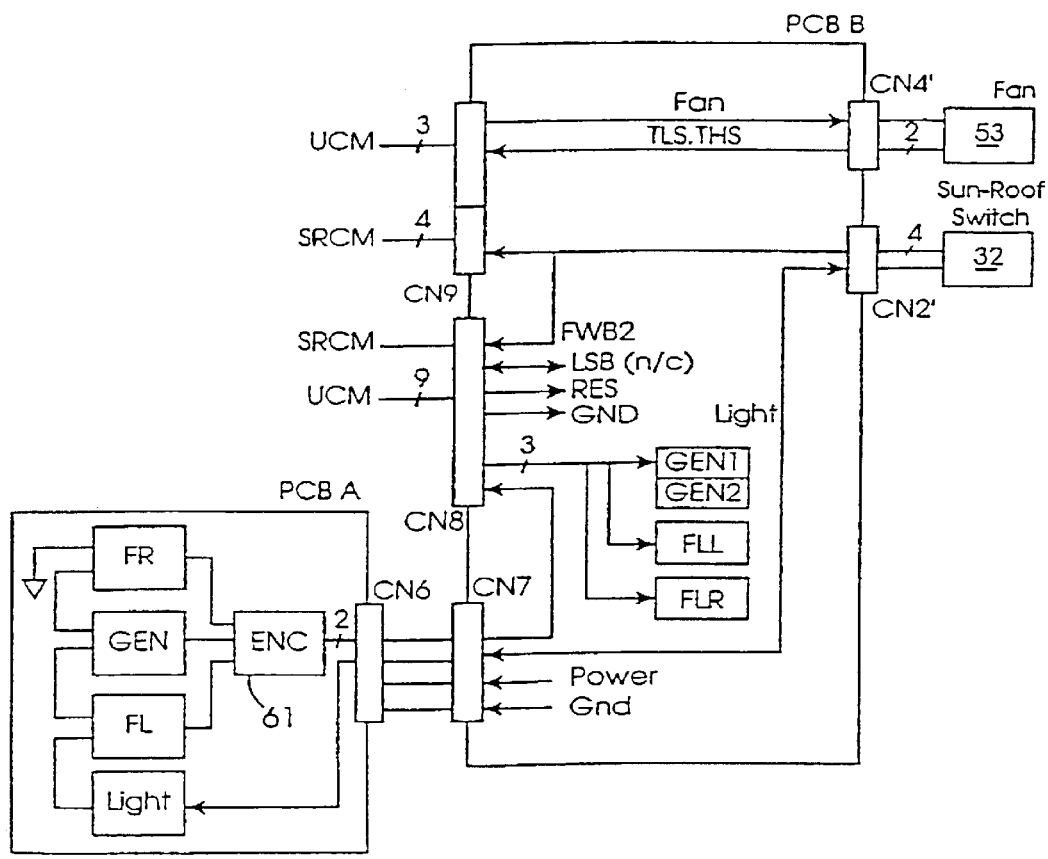
FIG. 6 is a block circuit diagram of a second embodiment of the RCM 42 in the roof housing of FIG. 2.

In a second embodiment of the RCM 42, FIG. 6, the microcontroller 30 is removed, and the roof housing electronics including the lights and switches are controlled directly by the UCM controller 22 across the vehicle harness via hard wire connections. The required changes are described with reference to the RCM 42 only, with changes being made mutatis mutandi to the UCM 40.

For ease of mounting within the roof housing 16, the RCM 42 comprises two separate PCB's, PCB A and PCB B, linked together via a multi-wire cable. In the second embodiment, the three switches FL, Gen and FR of the first embodiment are mounted on PCB A, and their respective outputs are encoded into a two wire output by encoding circuitry 61. The two wire output is connected via a connector CN6 across the multi-wire cable to a connector CN7 on PCB B. The two wires are then further connected via another connector CN8 to the vehicle harness which in turn connects the two wire output to the UCM 40. The two wire output is decoded either by dedicated decoding circuitry or within the UCM controller 22 to determine the status of the switches.

A light output corresponding to the LED O/P from the controller 30 of the first embodiment is directly connected between the UCM controller 22 and the switches FL, Gen and FR in the second embodiment. The light output is connected via the connectors CN8, CN6 and CN7 and the three wire cable to power the switches as before.

In both the first and second embodiments, placing of the sun-roof switch 32 is optional. In the second embodiment, the switch 32 is connected to the PCB B via multi-wire cable and a connector CN2' corresponding to CN2 of the first embodiment. When placed, the four switch outputs FWD, BWD, Tilt and Auto are further connected to the sun-roof control module SRCM 44 via a connector CN9. This obviates the need for the UCM 40 to communicate the status of the switch 32 to the SRCM 44 as in the first embodiment. In order to illuminate the switch 32, the light output is connected via the connector CN2' to the switch 32 so that, when placed, the sun-roof switch 32 is illuminated with the buttons FL, Gen and FR.

Because the FWD signal from the switch 32 is critical, it is split on the PCB B, and a duplicate signal FWD 2, is connected via the connector CN8 and a separate portion of the vehicle harness to the SRCM 44.

Placing of the fan unit 53 is also optional. In the second embodiment, the unit 53 is connected to the PCB B via a connector CN4' corresponding to CN4 of the first embodiment. The three signals FAN, TLS and THS are connected to the UCM 40 as before.

In the second embodiment, the four lamps GEN1, GEN2, FLL and FRL are controlled directly by the UCM 40. Three pulse width modulated control signals, corresponding to General and the outputs of the gates A1 and A2 of FIG. 4 are generated by the UCM 40 rather than within the RCM, and are connected via the vehicle harness to the connector CN8 from which they are connected to the lamps.

It will be appreciated by those skilled in the art that the invention can be used to control a prismatic mirror rather than an electro-optic mirror as described. Prismatic mirrors are well known in the art and include a prism which can be moved between first and second angular positions providing different degrees of reflectivity as seen by the driver. In the context of the present invention such a prism can be motor driven between its first and second positions, to achieve a variable reflectivity mirror, with control of the motor being effected by the UCM controller 22 in accordance with the signals from the ambient light sense resistors RA, RG and RB. Since prismatic mirrors normally have only two states, PWM would not be necessary in that case and the output from the controller 22 could be a single signal which was either on or off according to the desired angular position of the prism. Alternatively, a prismatic mirror can be manually actuated between two angular positions to give a variable reflectance mirror.

Also, while the invention has been described herein in terms of a CAN network, the invention could alternatively be implemented in any other suitable network, for example a network conforming to the French standard VAN (Vehicle Area Network) or the US standard J1850, or a purpose designed proprietary network could be used.

It will be further appreciated by those skilled in the art that various other vehicle components and systems may be associated with the vehicle control system and/or rearview mirror as described herein. For example, a battery level indicator, various lighting systems, vehicle tyre indicators, blind spot warning data, GPS antenna and directional information, intelligent vehicle highway system information, safety warning system information, rain sensor information provided by windshield contacting or non-contacting sensors, compass information for example from flux gate, magneto inductive or magneto resistive compasses, temperature information, trainable or universal garage door opening systems, vehicle seat positioning and occupancy detection systems, intrusion detection systems, cellular telephone and pager systems, emergency rescue systems, sun-roof (which could be electro-optic) control system and memory storage of various functions and data applicable to the above in addition to any other desirable vehicular information.

It will also be seen that the vehicle control system can be used to control one or more outside electro-optic, for example, electrochromic mirrors (not shown). This can be achieved by hardwiring the UCM 40 to the or each outside mirror, similar to the way in which the vanity lights are connected to the RCM 42; or by connecting the UCM via the bus LSB to one or more slave outside mirror controllers (not shown) which control the or each outside mirror; or by connecting the UCM via the CAN bus to a another CAN node for controlling the or each outside mirror.

The invention is not limited to the embodiments described herein which may be modified or varied without departing from the scope of the invention.

What is claimed is:

1. A vehicular control system comprising:
   a rearview mirror assembly comprising a housing and a variable reflectivity electro-optic mirror element; and
   a microcontroller operable to control the reflectivity of said variable reflectivity electro-optic mirror element, said microcontroller being operable to control a plurality of accessories of the vehicle via a node of a vehicle control network, said microcontroller being operable to at least one of receive signals from and transmit signals to at least one of said accessories via said node of said vehicle control network.

2. The vehicular control system of claim 1, wherein said mirror housing further includes at least one seat belt warning indicator for indicating that seat belts should be fastened.

3. The vehicular control system of claim 1, wherein said mirror housing further includes a remote keyless entry device.

4. The vehicular control system of claim 1, wherein said vehicle control network comprises a controller area network and wherein said node comprises a controller area network control node.

5. The vehicular control system of claim 1, wherein said microcontroller is in communication with a second microcontroller located at least one of in said mirror housing and exterior to said mirror housing, said microcontroller and said second microcontroller being cooperatively operable.

6. The vehicular control sysem claim 1, wherein said microcontroller is in communication with a second microcontroller located at least one of in said mirror housing and exterior to said mirror housing, said microcontroller and said second microcontroller being in master/slave relationship.

7. The vehicular control system of claim 6, wherein said master microcontroller communicates with said slave microcontroller according to a communication protocol.

8. The vehicular control system of claim 1, wherein the reflectivity of said variably reflectivity mirror element is varied under software control according to a selected value of at least one parameter.

9. The vehicular control system of claim 1, wherein said microcontroller is operable to control the reflectivity of said variable reflectivity mirror element according to the state of at least one ambient light sensor.

10. The vehicular control system of claim 9, wherein said variable reflectivity electro-optic mirror element includes an electro-optic cell whose transmissivity is determined in accordance with the duty cycle of a pulse width modulated signal provided by said microcontroller.

11. The vehicular control system of claim 10, wherein said pulse width modulated signal is smoothed to provide a substantially constant voltage signal which is applied to said electro-optic cell.

12. The vehicular control system of claim 1, wherein said at least one of said accessories comprises at least one of a remote keyless entry accessory, a vehicle sun roof accessory, an alarm accessory, at least one illumination device, a seat belt warning device, a battery level indicator, a vehicle tire indicator, a blind spot warning system, a global positioning system, a safety warning system, a rain sensor, a vehicle compass, a temperature sensor, a garage door opening system, an occupancy detection system, an intrusion detection system, a telephone system, and an emergency rescue system.

13. The vehicular control system of claim 1, wherein said microcontroller is operable to control at least one other accessory of the vehicle.

14. The vehicular control system of claim 13, wherein said at least one other accessory comprises at least one of a remote keyless entry accessory, a vehicle sun roof accessory, an alarm accessory, at least one illumination device, a seat belt warning device, a battery level indicator, a vehicle tire indicator, a blind spot warning system, a global positioning system, a safety warning system, a rain sensor, a vehicle compass, a temperature sensor, a garage door opening system, an occupancy detection system, an intrusion detection system, a telephone system, and an emergency rescue system.

15. The vehicular control system of claim 1, wherein said rearview mirror assembly includes said at least one of said accessories of the vehicle.

16. The vehicular control system of claim 1, wherein said at least one of said accessories is remote from said rearview mirror assembly.

17. The vehicular control system of claim 1, wherein said rearview mirror assembly comprises one of an interior rearview mirror assembly and an exterior rearview mirror assembly.

18. A vehicular control system comprising:
an interior rearview mirror assembly having a rearview mirror housing and a variable reflectivity electro-optic mirror unit;
a slave microcontroller for controlling the reflectivity of said electro-optic mirror unit;
a master microcontroller located in the vehicle and remote from said slave microcontroller, said master microcontroller being in communication with said slave microcontroller; and
at least one first accessory located at said interior rearview mirror assembly and at least one second accessory remote from said interior rearview mirror assembly, at least one of said master and slave microcontrollers being operable to control at least one of said first and second accessories via a node of a vehicle control network.

19. The vehicular control system of claim 18, wherein said master microcontroller comprises a node of said vehicle control network.

20. The vehicular control system of claim 19, wherein said master microcontroller communicates with said slave microcontroller according to a communication protocol.

21. The vehicular control system of claim 18, wherein at least two slave microcontrollers are in communication with said master controller, and wherein said master microcontroller controls an output device associated with one of said slave microcontrollers in response to an input device associated with the other of said slave microcontrollers.

22. The vehicular control system of claim 21, wherein one of said at least two slave microcontrollers is located in an exterior rearview mirror assembly of the vehicle.

23. The vehicular control system of claim 18, further including a roof housing positioned on the interior roof of the vehicle, said master microcontroller being located in the roof housing.

24. The vehicular control system of claim 18, wherein said slave microcontroller controls the reflectivity of said electro-optic mirror unit according to the state of at least one ambient light sensor.

25. The vehicular control system of claim 18, wherein said master microcontroller is operable to communicate with said at least one of said first and second accessories via said vehicle control network.

26. The vehicular control system of claim 18, wherein said at least one first accessory comprises at least one of a remote keyless entry accessory, a vehicle sun roof accessory, an alarm accessory, at least one illumination device, a seat belt warning device, a battery level indicator, a vehicle tire indicator, a blind spot warning system, a global positioning system, a safety warning system, a rain sensor, a vehicle compass, a temperature sensor, a garage door opening system, an occupancy detection system, an intrusion detection system, a telephone system, and an emergency rescue system.

27. The vehicular control system of claim 18, wherein said at least one second accessory comprises at least one of a remote keyless entry accessory, a vehicle sun roof accessory, an alarm accessory, at least one illumination device, a seat belt warning device, a battery level indicator, a vehicle tire indicator, a blind spot warning system, a global positioning system, a safety warning system, a rain sensor, a vehicle compass, a temperature sensor, a garage door opening system, an occupancy detection system, an intrusion detection system, a telephone system, and an emergency rescue system.

28. A vehicular control system comprising:
an exterior rearview mirror assembly having a rearview mirror housing and a variable reflectivity electro-optic mirror unit;
a slave microcontroller for controlling the reflectivity of said electro-optic mirror unit;
a master microcontroller located in the vehicle and remote from said slave microcontroller, said master microcontroller being in communication with said slave microcontroller; and
at least one first accessory located at said exterior rearview mirror assembly and at least one second accessory remote from said exterior rearview mirror assembly, at least one of said master and slave microcontrollers being operable to control at least one of said first and second accessories via a node of a vehicle control network.

29. The vehicular control system of claim 28, wherein said master microcontroller comprises a node of said vehicle control network.

30. The vehicular control system of claim 29, wherein said master microcontroller communicates with said slave microcontroller accQrding to a communication protocol.

31. The vehicular control system of claim 28, wherein at least two slave microcontrollers are in communication with said master controller, and wherein said master microcontroller controls an output device associated with one of said slave microcontrollers in response to an input device associated with the other of said slave microcontrollers.

32. The vehicular control system of claim 28, wherein one of said at least two slave microcontrollers is located in an interior rearview mirror assembly of the vehicle.

33. The vehicular control system of claim 28, further including a roof housing positioned on the interior roof of the vehicle, said master microcontroller being located in the roof housing.

34. The vehicular control system of claim 28, wherein said slave microcontroller controls the reflectivity of said electro-optic mirror unit according to the state of at least one ambient light sensor.

35. The vehicular control system of claim 28, wherein said master microcontroller is operable to communicate with said at least one of said first and second accessories via said vehicle control network.

36. The vehicular control system of claim 28, wherein said at least one first accessory comprises at least one of a remote keyless entry accessory, a vehicle sun roof accessory, an alarm accessory, at least one illumination device, a seat belt warning device, a battery level indicator, a vehicle tire indicator, a blind spot warning system, a global positioning system, a safety warning system, a rain sensor, a vehicle compass, a temperature sensor, a garage door opening system, an occupancy detection system, an intrusion detection system, a telephone system, and an emergency rescue system.

37. The vehicular control system of claim 28, wherein said at least one second accessory comprises at least one of a remote keyless entry accessory, a vehicle sun roof accessory, an alarm accessory, at least one illumination device, a seat belt warning device, a battery level indicator, a vehicle tire indicator, a blind spot warning system, a global positioning system, a safety warning system, a rain sensor, a vehicle compass, a temperature sensor, a garage door opening system, an occupancy detection system, an intrusion detection system, a telephone system, and an emergency rescue system.

* * * * *

UNITED STATES PATENT AND TRADEMARK OFFICE
CERTIFICATE OF CORRECTION

PATENT NO. : 6,904,348 B2  
APPLICATION NO. : 10/356939  
DATED : June 7, 2005  
INVENTOR(S) : Drummond et al.

Page 1 of 1

It is certified that error appears in the above-identified patent and that said Letters Patent is hereby corrected as shown below:

Column 1  
Line 15, "refrrence" should be --reference--

Column 2  
Line 18, "indentifiers" should be --identifiers--  
Line 66, "5,572,345" should be --5,572,354--

Column 4  
Line 3, "Vac_cutoff" should be --Vec_cutoff--

Column 10  
Claim 6, Line 60, "sysem" should be --system of--

Column 13  
Claim 30, Line 3, "accQrding" should be --according--  
Claim 32, Line 10, "28" should be --31--

Signed and Sealed this

Tenth Day of February, 2009

JOHN DOLL  
*Acting Director of the United States Patent and Trademark Office*